US010538279B2

(12) United States Patent
Hellholm et al.

(10) Patent No.: US 10,538,279 B2
(45) Date of Patent: Jan. 21, 2020

(54) VEHICLE FRAME FOR A TRACKED VEHICLE

(71) Applicant: BAE Systems Hägglunds Aktiebolag, Örnsköldsvik (SE)

(72) Inventors: Björn Hellholm, Arnäsvall (SE); Pär Söderberg, Bjästa (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 121 days.

(21) Appl. No.: 15/758,699

(22) PCT Filed: Jun. 22, 2016

(86) PCT No.: PCT/SE2016/050608
§ 371 (c)(1),
(2) Date: Mar. 8, 2018

(87) PCT Pub. No.: WO2017/044027
PCT Pub. Date: Mar. 16, 2017

(65) Prior Publication Data
US 2018/0251159 A1    Sep. 6, 2018

(30) Foreign Application Priority Data
Sep. 9, 2015    (SE) ........................................ 1551154

(51) Int. Cl.
*B62D 33/067*    (2006.01)
*B60F 3/00*    (2006.01)
(Continued)

(52) U.S. Cl.
CPC .............. *B62D 33/067* (2013.01); *B60F 3/00* (2013.01); *B62D 21/18* (2013.01); *B62D 55/06* (2013.01)

(58) Field of Classification Search
CPC .................................. B62D 23/00; B60F 3/00
See application file for complete search history.

(56) References Cited

U.S. PATENT DOCUMENTS 3,645,350 A    2/1972    Deli et al.
3,878,912 A    4/1975    Samatov et al.
(Continued)

FOREIGN PATENT DOCUMENTS

EP    2357286 A1    8/2011
JP    5094590 B2 *  12/2012    ............ E02F 3/3414
(Continued)

OTHER PUBLICATIONS

Extended European Search Report received for European Patent Application No. 16844798.5, dated Mar. 11, 2019, 5 pages.
(Continued)

*Primary Examiner* — Nicole T Verley
(74) *Attorney, Agent, or Firm* — Morrison and Foerster LLP

(57) ABSTRACT

The present invention relates to a tracked amphibious vehicle having a vehicle frame and a pair of track assemblies attachable to a respective side of said vehicle frame, said vehicle frame being arranged to support a tilting vehicle cab and an engine configuration, said vehicle frame comprising a pair of separated longitudinal wall elements extending in the longitudinal direction of the tracked vehicle and a bottom element connecting said pair of longitudinal wall elements so as to form a space for supporting and housing said engine configuration, wherein said vehicle frame comprises an extension frame and has a lateral extension so that no portion of the vehicle frame extends laterally passed a respective track of said pair of track assemblies so as to allow easy access to said space.

6 Claims, 7 Drawing Sheets

(51) Int. Cl.
    *B62D 55/06*    (2006.01)
    *B62D 21/18*    (2006.01)

(56) References Cited

U.S. PATENT DOCUMENTS

| | | | | |
|---|---|---|---|---|
| 3,895,728 | A | | 7/1975 | Heggen |
| 4,955,455 | A | | 9/1990 | Albright et al. |
| 5,520,500 | A | * | 5/1996 | McIlwain ............ E02F 3/3405 180/89.19 |
| 5,551,826 | A | * | 9/1996 | Todd .................... B62D 33/067 180/89.14 |
| 6,357,820 | B1 | * | 3/2002 | Nagatsuka ............ E02F 3/3414 180/89.14 |
| 7,396,070 | B2 | * | 7/2008 | Albright ............ B62D 33/0617 296/190.05 |
| 7,673,931 | B2 | * | 3/2010 | Takano ............ B62D 33/0625 180/89.14 |
| 7,677,647 | B2 | * | 3/2010 | Cott ........................ E02F 9/24 296/190.08 |
| 7,806,466 | B2 | * | 10/2010 | Shurts ..................... E02F 9/166 180/89.14 |
| 7,909,389 | B2 | * | 3/2011 | Bell ........................ E02F 9/166 180/89.14 |
| 7,975,793 | B1 | * | 7/2011 | Claas ...................... B60N 2/24 180/89.13 |
| 8,038,379 | B2 | * | 10/2011 | Yamashita .......... B62D 33/067 180/89.18 |
| 8,070,170 | B2 | * | 12/2011 | Crawford ............ B62D 33/067 180/89.14 |
| 8,096,608 | B2 | * | 1/2012 | Andou ................ B62D 33/067 180/89.14 |
| 8,408,637 | B1 | * | 4/2013 | Dilts ...................... B62D 33/07 180/89.16 |
| 8,936,300 | B2 | * | 1/2015 | Davis .................... B62D 33/07 105/456 |
| 9,045,882 | B2 | * | 6/2015 | Major .................. A01G 23/006 |
| 10,308,108 | B2 | * | 6/2019 | Honda .................. E02F 3/3414 |
| 2008/0038966 | A1 | * | 2/2008 | McDowell ............. B60F 3/003 440/12.5 |
| 2008/0265625 | A1 | * | 10/2008 | List ...................... B62D 21/152 296/190.06 |
| 2010/0237658 | A1 | | 9/2010 | Allaire et al. |
| 2011/0017537 | A1 | * | 1/2011 | Andou ................ B60K 15/063 180/89.16 |
| 2013/0011232 | A1 | * | 1/2013 | Tabeta .................. B62D 25/10 414/694 |
| 2014/0288763 | A1 | | 9/2014 | Bennett et al. |

FOREIGN PATENT DOCUMENTS

| | | |
|---|---|---|
| RU | 2161101 C1 | 12/2000 |
| RU | 2235659 C2 | 9/2004 |
| WO | 2017/044027 A1 | 3/2017 |

OTHER PUBLICATIONS

International Preliminary Report on Patentability received for PCT Patent Application No. PCT/SE2016/050608, dated Mar. 22, 2018, 7 pages.
International Search Report and Written Opinion received for PCT Patent Application No. PCT/SE2016/050608, dated Aug. 31, 2016, 10 pages.
Office Action received for Swedish Patent Application No. 1551154-6, dated Apr. 13, 2016, 4 pages (English Translation Only).
Decision to Grant received for Russian Patent Application No. 2018112467, dated Sep. 27, 2019, 15 pages (7 pages of English Translation and 8 pages of Official Copy).

\* cited by examiner

VEHICLE FRAME FOR A TRACKED VEHICLE

CROSS REFERENCE TO RELATED APPLICATIONS

This application is a U.S. National Phase patent application of PCT/SE2016/050608, filed Jun. 22, 2016, which claims priority to Swedish Patent Application No. 1551154-6, filed Sep. 9, 2015, the disclosures of which are incorporated herein by reference in their entirety.

TECHNICAL FIELD

The present invention relates to a tracked amphibious vehicle having a vehicle frame according to the preamble of claim 1.

BACKGROUND ART

Tracked vehicles such as tracked military vehicles are provided with a vehicle frame for housing an engine configuration. The vehicle frame is also arranged to support the vehicle cab. Such a tracked vehicle comprises a pair of track assemblies attached to a respective side of said vehicle frame. Such a vehicle frame comprises a pair of separated longitudinal wall elements extending in the longitudinal direction of the tracked vehicle and a bottom element connecting the pair of longitudinal wall elements so as to form a space for supporting and housing the engine configuration. Such a vehicle frame further comprises shelf portions arranged in the upper portion of the vehicle frame, extending laterally above the track assemblies. During assembly of such a vehicle it is difficult to access the components, e.g. components of the engine configuration, inside the vehicle frame, resulting in the assembly of the tracked vehicle taking relatively long time.

US20100237658 discloses such a tracked vehicle with a vehicle frame having structural portions, i.e. shelf portions, of sheet material provided with series of bents, where the structural portion is formed as a heat exchanger to exchange heat from heat carrier to environment. The structural portions are arranged in the upper portion of the vehicle frame and are extending laterally above the track assemblies.

There is thus a need to present improvements within vehicle frames of amphibious vehicles.

OBJECTS OF THE INVENTION

An object of the present invention is to provide a tracked amphibious vehicle having a vehicle frame which facilitates easy assembly of the tracked vehicle.

An additional object of the present invention is to provide a tracked amphibious vehicle having a vehicle frame which facilitates easy access to components within the vehicle frame.

SUMMARY OF THE INVENTION

These and other objects, apparent from the following description, are achieved by a tracked amphibious vehicle having a vehicle frame as set out in the appended independent claims. Preferred embodiments of the tracked amphibious vehicle are defined in appended dependent claims.

According to the invention the objects are achieved by a tracked amphibious vehicle having a vehicle frame and a pair of track assemblies attachable to a respective side of said vehicle frame. The vehicle frame is arranged to support a vehicle cab and an engine configuration. The vehicle frame is arranged to receive said cab via hinge means so as to allow tilting of said cab about said hinge means between a closed position and an open position The vehicle frame comprises a pair of separated longitudinal wall elements extending in the longitudinal direction of the tracked vehicle and a bottom element connecting said pair of longitudinal wall elements so as to form a space for supporting and housing said engine configuration, wherein said space becomes accessible when the cab is in said open position. The vehicle frame further comprises an extension frame forming an extension in a substantially vertical direction, wherein said extension frame is wedge-shaped so that the extension frame has a decreasing vertical extension in direction from the rear portion to a front portion of the vehicle frame. Said vehicle frame is configured to have a lateral extension on its respective side ending prior to or substantially at the level of the a respective track of the pair of track assemblies when assembled to the vehicle frame so that no portion of the vehicle frame extends laterally passed the respective track of said pair of track assemblies so as to allow easy access to said space. Thus, said vehicle frame has a lateral extension so that no portion of the vehicle frame extends laterally passed the respective track of said pair of track assemblies when the pair of track assemblies are attached to the respective side of the vehicle frame so as to allow easy access to said space prior to attaching the pair of track assemblies to the vehicle frame. Hereby easy assembly of the tracked vehicle is facilitated. By having the vehicle frame extending laterally so that its lateral extension on its respective side ends prior to or substantially at the level of the respective track of the track assembly when assembled to the vehicle frame easy access to the vehicle frame and the interior of the vehicle frame is obtained as it is possible to stand immediately adjacent to the respective side of the vehicle frame prior to the assembly of the track assembly of the vehicle. Thus, hereby installation of the engine configuration may be easily performed prior to assembly of track assembly and cab as an operator may stand immediately next to the vehicle frame introducing vehicle components into the vehicle frame for attachment. Hereby the assembly time is reduced compared to having extension portions laterally extending from the vehicle frame and/or the actual track assembly.

By means of the wedge-shaped extension frame access to vehicle frame is optimized and still facilitating sealing against the cab. Such an extension frame of the vehicle frame facilitates sealing between the vehicle frame and the cab in one single sealing plane.

According to an embodiment the extension frame is arranged to form an extension in a substantially vertical direction so that a rear portion of the vehicle frame extends above a top portion of a rear section of the engine configuration. Hereby efficient support and sealing against the cab is facilitated as the cab hereby may be supported by the extension portion. Further, the extension frame with the rear portion provides a surface for connection points for connecting vehicle components for e.g. the engine configuration of the vehicle. Such an extension frame of the vehicle frame facilitates sealing between the vehicle frame and the cab in one single sealing plane. Further, the extension frame with the rear portion facilitates an efficient and stable attachment of fuel tank and cooler device which may be arranged vertically at the rear portion of the vehicle frame via a stand or the like.

According to an embodiment of the vehicle frame said hinge means is configured to be arranged in the front portion of said vehicle frame. By thus tilting the cab by means of the hinge means in the front of the vehicle frame optimized access to the rear portion of the vehicle frame is obtained for optimized serviceability.

According to an embodiment of the vehicle frame said extension frame is configured such that structures of said cab are configured to extend externally relative to and below side portions of said extension frame. Hereby efficient protection of the vehicle frame and hence engine configuration and components housed by the vehicle frame is facilitated. Such structures are according to a variant constituted by right and left wall portions of the right and left side of the cab.

According to an embodiment of the tracked amphibious vehicle the vehicle further comprises a sealing arrangement comprising sealing means arranged to provide sealing between the cab and the vehicle frame in the closed position.

According to an embodiment of the tracked amphibious vehicle the sealing arrangement when the cab is in the closed position, is arranged to provide a confined space for protecting components comprising the engine configuration.

According to an embodiment said vehicle is an articulated vehicle.

BRIEF DESCRIPTION OF THE DRAWINGS

For a better understanding of the present invention reference is made to the following detailed description when read in conjunction with the accompanying drawings, wherein like reference characters refer to like parts throughout the several views, and in which.

DETAILED DESCRIPTION

Herein the term "engine configuration" refers to any suitable means for driving the vehicle. "Engine configuration" comprises according to an embodiment an engine. The engine is according to an embodiment a combustion engine. "Engine configuration" comprises according to an embodiment an electric motor. "Engine configuration" comprises according to an embodiment other parts of a drivetrain. "Engine configuration" comprises components for connecting an engine/motor such as cables, conduits or the like. The term "engine configuration" may refer to an engine configuration for providing any suitable power supply for the propulsion of the vehicle. The term "engine configuration" may refer to an engine configuration for providing diesel-electric drive of the vehicle. The term "engine configuration" may refer to an engine configuration for providing hybrid-powered drive of the vehicle. The term "engine configuration" may refer to an engine configuration for providing electric drive of the vehicle, where power according to one alternative is supplied by means of an energy storage device such as a battery unit, fuel cell or capacitor unit.

With reference to FIG. 1a-b, 2a-b different views of a tracked vehicle 1 according to the present invention is shown.

Figure 10:
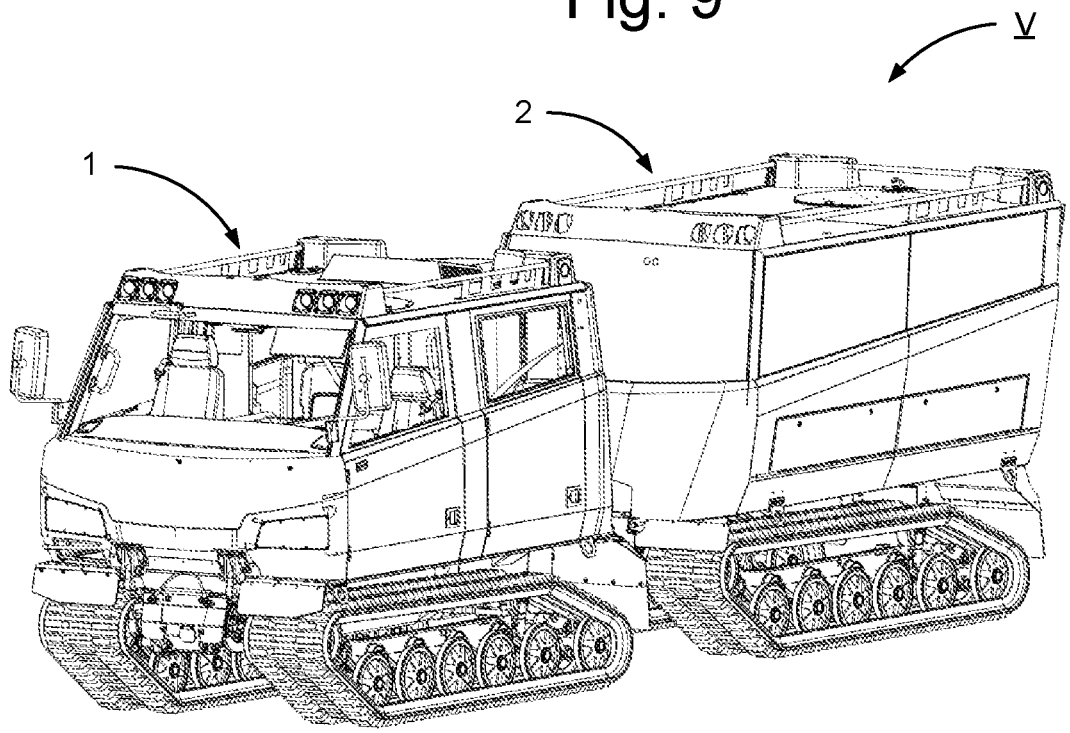
FIG. 10 schematically illustrates an articulated vehicle comprising the vehicle in FIG. 1a according to an embodiment of the present invention.

The vehicle 1 is according to an embodiment part of an articulated vehicle V illustrated in FIG. 10. The articulated vehicle V is provided with a front vehicle 1 and a rear vehicle 2. The vehicle 1 thus in that embodiment constitutes the front vehicle 1 of the articulated vehicle I. Thus, the front vehicle 1 and the rear vehicle 2 are steerably interconnected by means of a steering device, not shown. The front vehicle 1 and rear vehicle 2 are hereby interconnected over a link mechanism of the steering device, the front vehicle 1 and rear vehicle being mutually pivotable by means of the link mechanism of the steering device. In e.g. FIGS. 1a and 1b a shaft configuration 70 of the front vehicle 1 connectable to the rear vehicle 2 is shown.

The vehicle 1 comprises a vehicle frame 10 and a cab 20. The cab 20 is supported by the vehicle frame 10.

Figure 7:
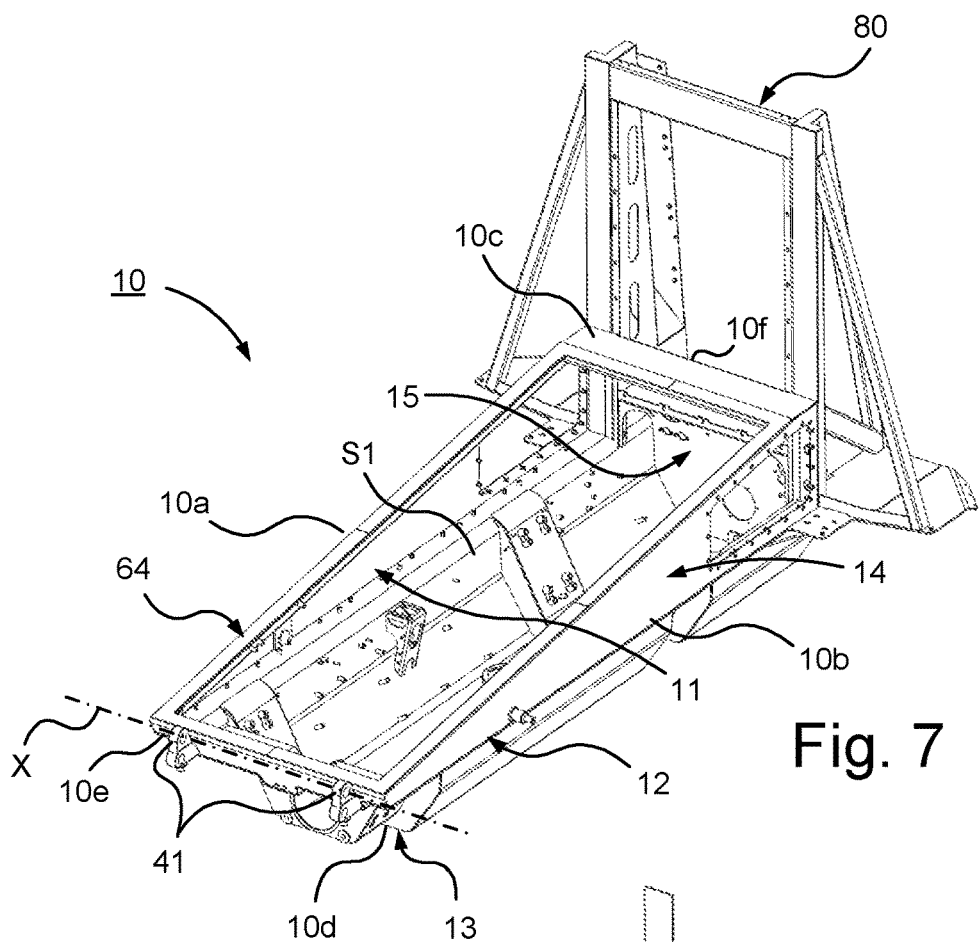
FIG. 7 schematically illustrates a perspective view of the vehicle frame in FIG. 4 without track assembly pair.

As illustrated in FIG. 7, the vehicle frame 10 has a right side 10a, a left side 10b, an upper side 10c, an underside 10d, a front side 10e and a rear side 10f.

The vehicle frame 10 has a rectangular shape formed by the sides 10a, 10b, 10e, 10f of the vehicle frame 10. The vehicle frame 10 comprises a contact surface 14c of the upper side 10c, the contact surface 14c being constituted by the uppers side of the rectangular framed shape of the vehicle frame 10.

Figure 1A:
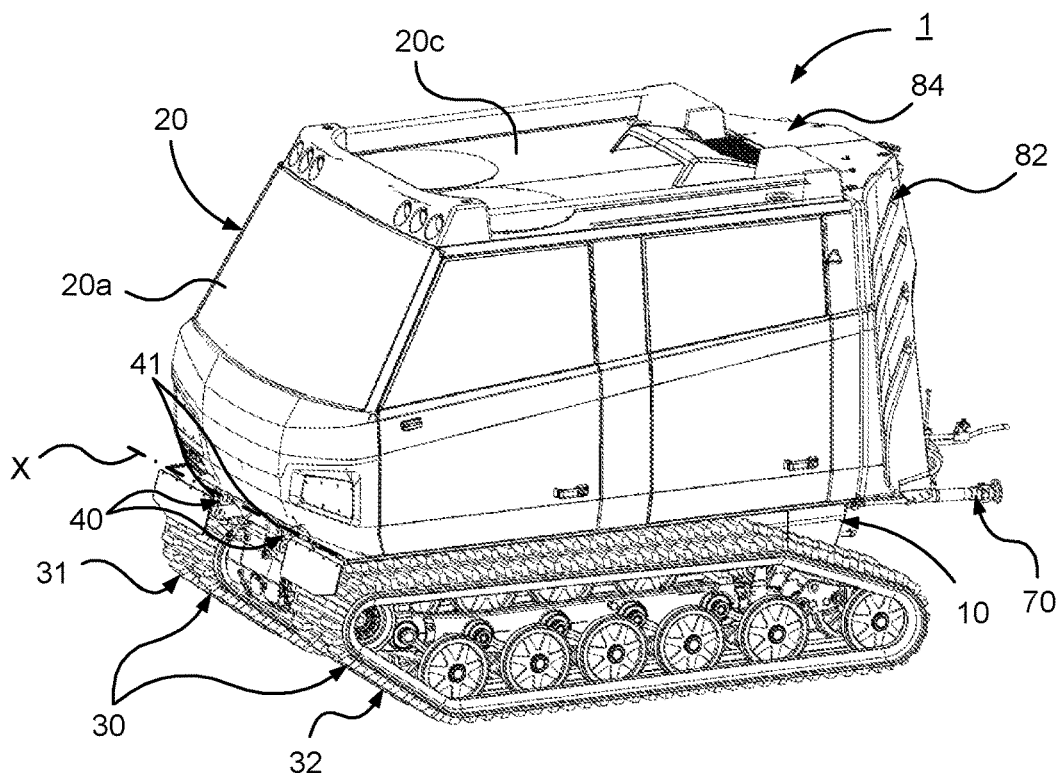
FIG. 1a schematically illustrates a perspective view of a tracked vehicle with the cab in a closed position according to an embodiment of the invention.
Figure 1B:
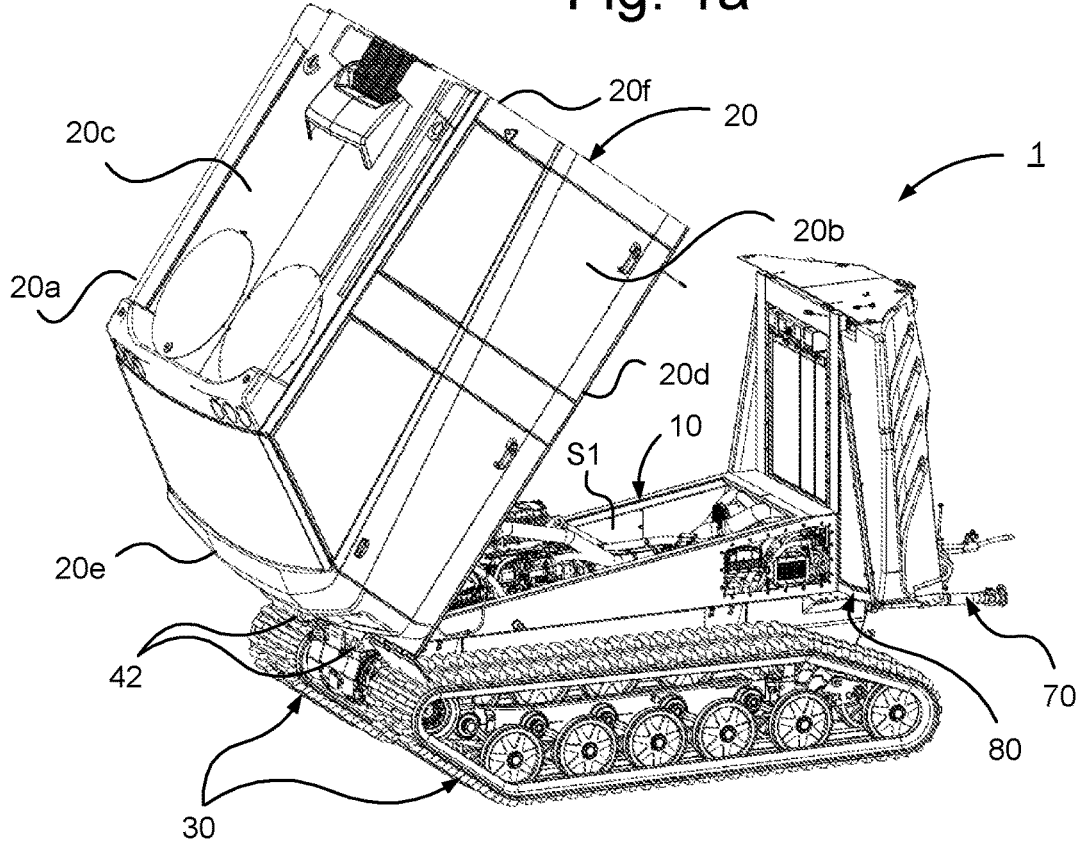
FIG. 1b schematically illustrates a front perspective view of the vehicle in FIG. 1a with the cab tilted to an open position.

As illustrated in FIG. 1b, the cab 20 has a right side 20a, a left side 20b, an upper side 20c, an underside 20d, a front side 20e and a rear side 20f.

The vehicle comprises a pair of track assemblies 30. Said pair of track assemblies 30 comprises two track assemblies 31, 32 arranged on opposite sides of the vehicle 1, i.e. a right track assembly 31 arranged on the right side of the vehicle 1 and a left track assembly 32 arranged on the left side of the vehicle 1.

The pair of track assemblies 30 is attached to a respective side of the vehicle frame 10. The right track assembly 31 is attached to the right side of the vehicle frame 10 and the left track assembly 32 is attached to the left side of the vehicle frame 10.

Figure 2A:
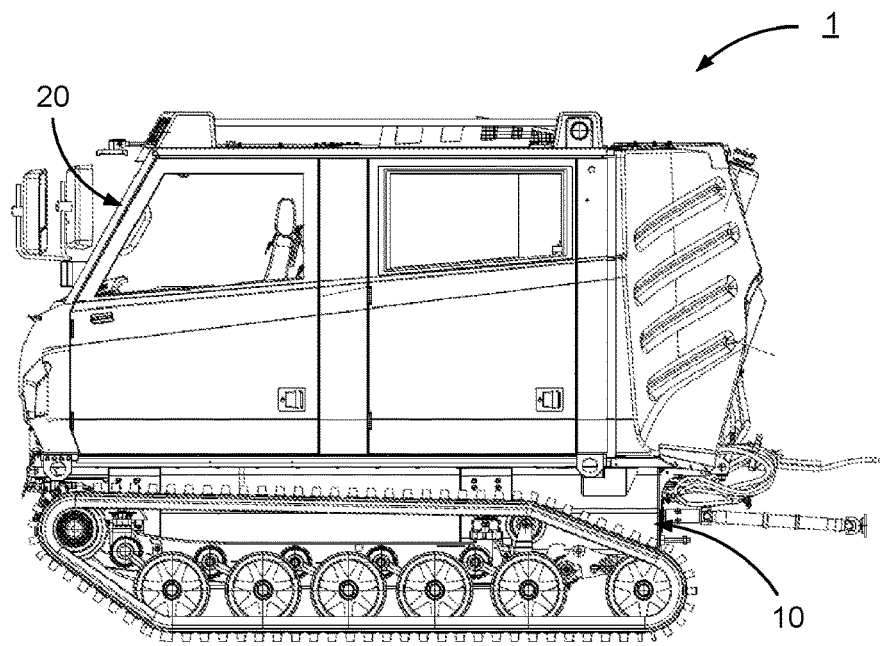
FIG. 2a schematically illustrates a side view of the vehicle in FIG. 1a with the cab in the closed position.
Figure 2B:
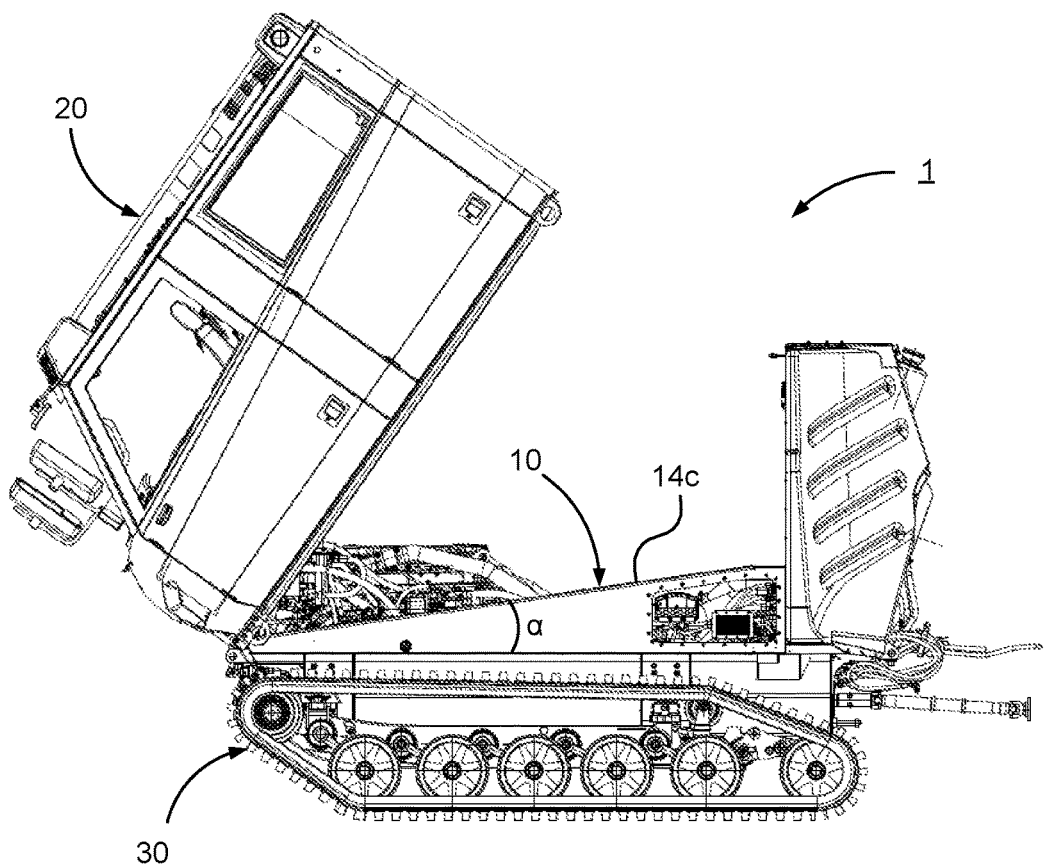
FIG. 2b schematically illustrates a side view of the vehicle in FIG. 1a with the cab in the open position.

The cab 20 is connected to the vehicle frame 10 via hinge means 40 so as to allow tilting of said cab about said hinge means 40 between a closed position and an open position. FIGS. 1a and 2a illustrates the vehicle 1 with the cab 20 in the closed position the and FIGS. 1b and 2b the vehicle 1 with the cab 20 in the open position. The hinge means 40 comprises hinge members 41 arranged on the vehicle frame 10 and hinge members 42 arranged on the cab 20.

The cab is according to an embodiment pivotable about an axis X of said hinge means 40.

The cab 20 is arranged to be fixed to the vehicle frame 10 in the closed position.

The vehicle 1 comprises an engine configuration 50 for driving the vehicle 1. The engine configuration 50 is arranged to propel the vehicle. The engine configuration 50 is arranged to drive the tracks of the track assembly 30 by means of driving the drive wheels of the track assembly 30.

The engine configuration 50 of the vehicle 1 is arranged to be housed in the vehicle frame 10. The vehicle frame 10 is thus arranged to receive the engine configuration 50. The vehicle frame thus has an opening on the upper side for introducing the engine configuration 50 into the vehicle frame 10.

As illustrated in FIG. 7, the vehicle frame 10 comprises a pair of separated longitudinal wall elements 11, 12 extending in the longitudinal direction of the vehicle 1 and a bottom element 13 connecting said pair of longitudinal wall elements 11, 12 so as to form a space S1 for supporting and housing the engine configuration. The separated wall elements 11, 12 comprise a right wall element 11 and a left wall element 12.

The vehicle frame 10 has a lateral extension so that no portion of the vehicle frame 10 extends passed the pair of track assemblies 30 so as to allow easy access to the space S1. Hereby easy assembly of the tracked vehicle 1 is facilitated. The vehicle frame 10 has a lateral extension so that no portion of the vehicle frame 10 extends laterally passed the respective track 31, 32 of said pair of track assemblies 30 so as to allow easy access to said space. Thus, said vehicle frame 10 has a lateral extension so that no portion of the vehicle frame 10 extends laterally passed the respective track 31, 32 of said pair of track assemblies 30 when the pair of track assemblies 30 are attached to the respective side 10a, 10b of the vehicle frame 10 so as to allow easy access to said space S1 prior to attaching the pair of track assemblies 30 to the vehicle frame 10.

Traditionally prior art vehicle frames for tracked vehicles comprises track shelves. The track shelves are thus functional elements integrated into the vehicle frame which protrude laterally, i.e. extends laterally from the respective side of the vehicle frame past the respective track of the track assemblies. While these track shelves serves some functional purposes, they also tend to present problems for workers entering into close proximity of the space housing the engine configuration during for example assembly stages of the vehicle when the track assemblies not yet have been mounted to the vehicle frame. These problems are alleviated by the present invention since the vehicle frame of the present invention do not extend passed the respective tracks as mentioned above.

The vehicle frame 10 thus extends laterally so that its lateral extension on its respective side 10a, 10b ends prior to or substantially at the level of the respective track 31, 32 of the track assembly 30. By having the vehicle frame 10 extending laterally so that its lateral extension on its respective side 10a, 10b ends prior to or substantially at the level of the respective track 31, 32 of the track assembly 30 when assembled to the vehicle frame 10 easy access to the vehicle frame 10 and the interior, i.e. the space S1, of the vehicle frame is obtained as it is possible to stand immediately adjacent to the respective side of the vehicle frame 10 prior to the assembly of the track assembly 30 of the vehicle 1. Thus, hereby installation of the engine configuration 50 may be easily performed prior to assembly of track assembly 30 and cab 20 as an operator may stand immediately next to the vehicle frame 10 when introducing vehicle components into the vehicle frame 10 for attachment. Hereby the assembly time of the vehicle 1 is reduced compared to having extension portions laterally extending from the vehicle frame and/or the actual track assembly.

Figure 8:
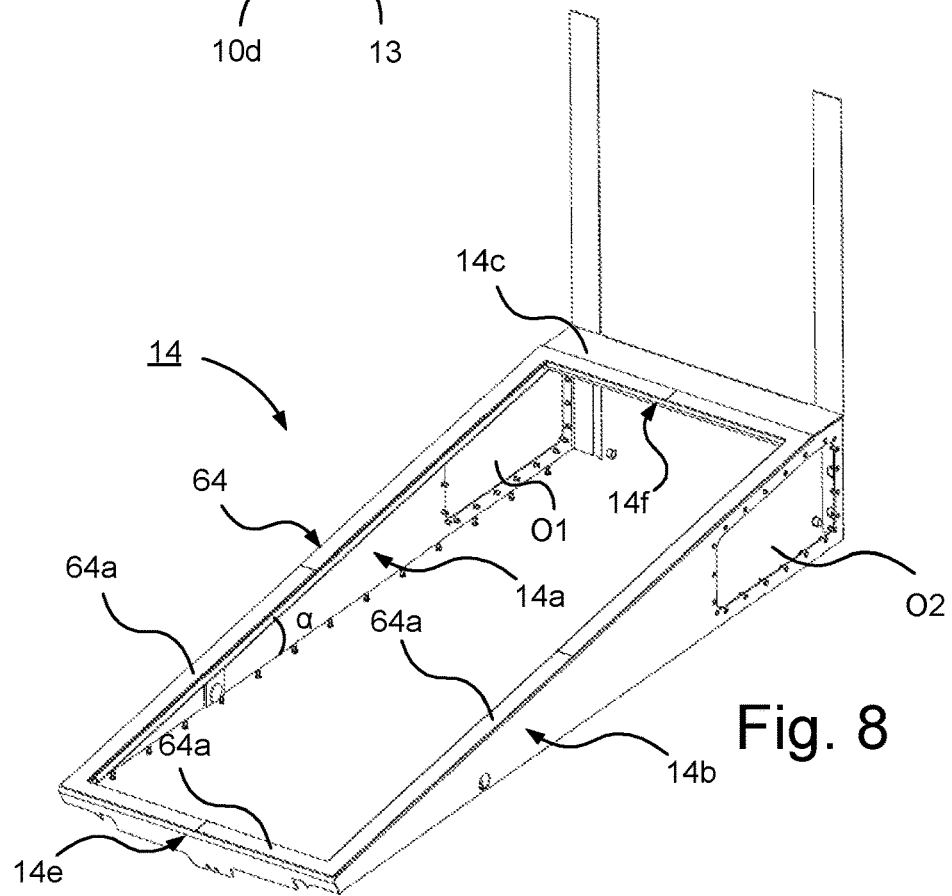
FIG. 8 schematically illustrates a perspective view of an upper extension frame of the vehicle frame in FIG. 3.

The vehicle frame 10 further comprises an extension frame 14 forming an extension in a substantially vertical direction. The extension frame 14 is illustrated in FIG. 8 as a separate part of the vehicle frame 10. The extension frame 14 is thus according to this embodiment a separate part attachable to the part of the vehicle frame 10 with the bottom element 13.

The extension frame 14 has a right wall element 14a constituting a part of the right wall element 11 and a left wall element 14b constituting a part of the left wall element 12, the wall elements 14a, 14b of the extension frame 14 thus extending in the longitudinal direction of the vehicle 1. The wall elements 14a, 14b of the extension frame 14 are substantially vertically arranged.

The extension frame 14 is wedge-shaped so that the extension frame has a decreasing vertical extension in direction from the rear portion to a front portion of the vehicle frame. Thus, the wall elements 14a, 14b have a wedged shape. The longitudinal wall elements 14a, 14b are connected by transversal elements 14e, 14f forming a frame having a rectangular shape. The transversal elements 14e, 14f comprises a front transversal element 14e and a rear transversal element 14f.

According to an embodiment of the vehicle frame said extension frame is wedge-shaped so that the extension frame has a substantially continuous decreasing vertical extension in direction from the rear portion to a front portion of the vehicle frame.

By arranging the extension frame to have a substantially continuous decreasing vertical extension in direction from the rear portion to a front portion of the vehicle frame the upper periphery, of the extension frame surrounding an opening into the interior space S1, runs in one single plane. This facilitates sealing since there are no discontinuities along the upper periphery of the extension frame that could present problems in terms of providing a sealing between the extension frame of the vehicle frame and the cab.

Figure 4:
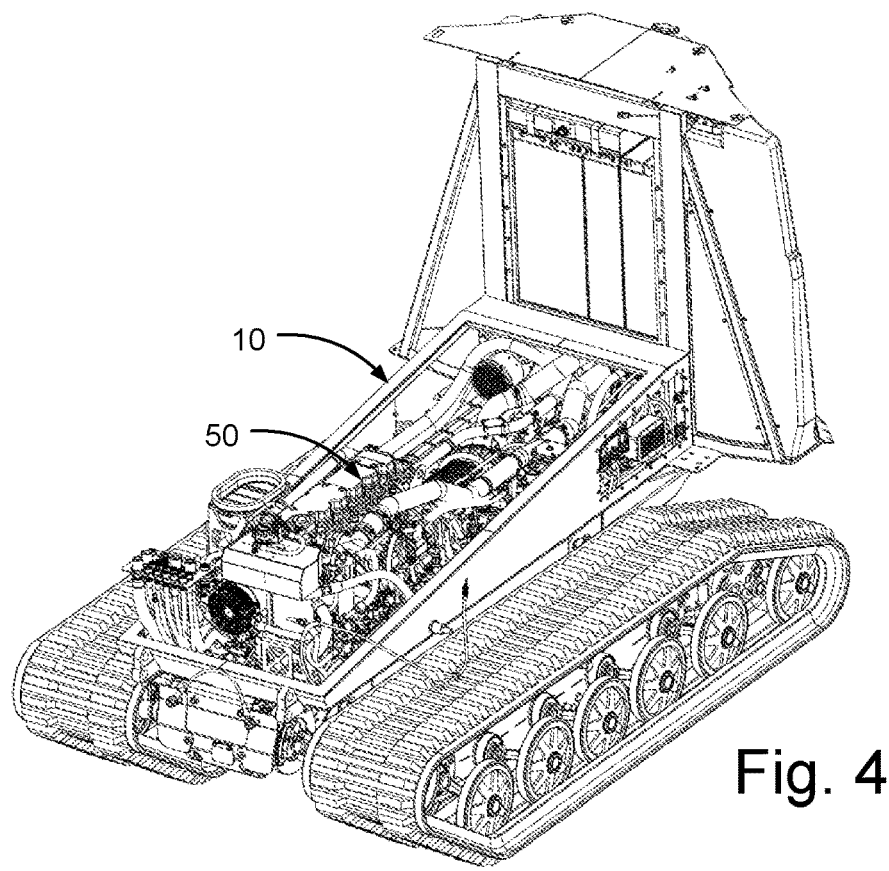
FIG. 4 schematically illustrates a perspective view of a vehicle frame of the vehicle in FIG. 1a with track assembly pair according to an embodiment of the invention.

The height of the longitudinal wall elements 14a, 14b of the extension frame 14 is thus higher in the rear portion than in the front portion. The extension frame 14 forms an extension in a substantially vertical direction so that a rear portion of the vehicle frame 10 extends above a top portion of a rear section of the engine configuration 50 as illustrated e.g. in FIG. 4 and FIG. 5. The rear portion comprises or is constituted by the rear transversal element 14f.

With the wedged shape of the extension frame 14 access to the vehicle frame 10 is optimized and still facilitating sealing against the cab 20. Such an extension frame 14 of the vehicle frame 10 facilitates sealing between the vehicle frame 10 and the cab 20 in one single sealing plane.

Figure 6:
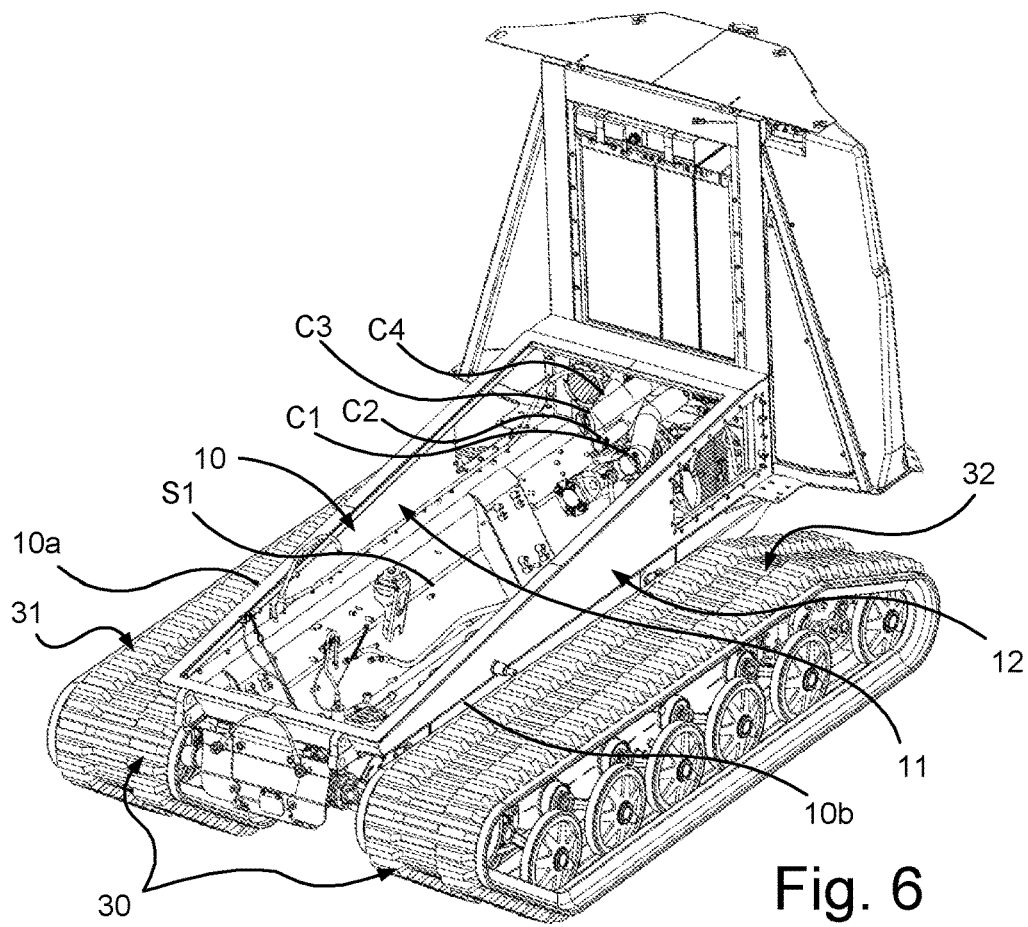
FIG. 6 schematically illustrates a perspective view of the vehicle frame with track assembly pair in FIG. 4 with engine configuration removed.

Further, the vehicle frame 10 has a back element 15 for providing connection points for vehicle components. The back element 15 is arranged substantially vertical in connection to the rear transversal element 14f of the extension frame 14 and between the longitudinal wall elements 14a, 14b. The back element 15 thus provides a surface for connection points for connecting vehicle components for e.g. the engine configuration 50 of the vehicle. FIG. 6 shows connection members C1, C2, C3, C4 for connecting components of the engine configuration 50 such as conduits for fuel.

The wall elements 14a, 14b of the extension frame 14 has openings O1, O2 in the rear portion of the respective wall element 14a, 14b for improved accessibility.

The extension frame 14 thus has a rectangular shape. The extension frame 14 comprises a contact surface 14c of the vehicle frame 10, the contact surface 14c being constituted by the upper sides of the elements 14a, 14b, 14e, 14f. The contact surface 14c forms a plane. The contact surface 14c thus has a planar configuration. The plane has a certain inclination a relative to the horizontal plane of the vehicle 1 due to the wedged shape of the extension frame 14. The contact surface 14c of the extension frame 14 thus has a frame configuration.

The cab 20 is configured such that structures 22, 24 of said cab are configured to extend externally relative to and below side portions of said extension frame 14 in the closed position of the cab 20. Hereby efficient protection of the vehicle frame 10 and hence engine configuration 50 and components housed by the vehicle frame 10 is facilitated. Such structures are according to a variant constituted by right and left wall portions 22, 24 of the right and left side 20a, 20b of the cab 20.

Figure 3:
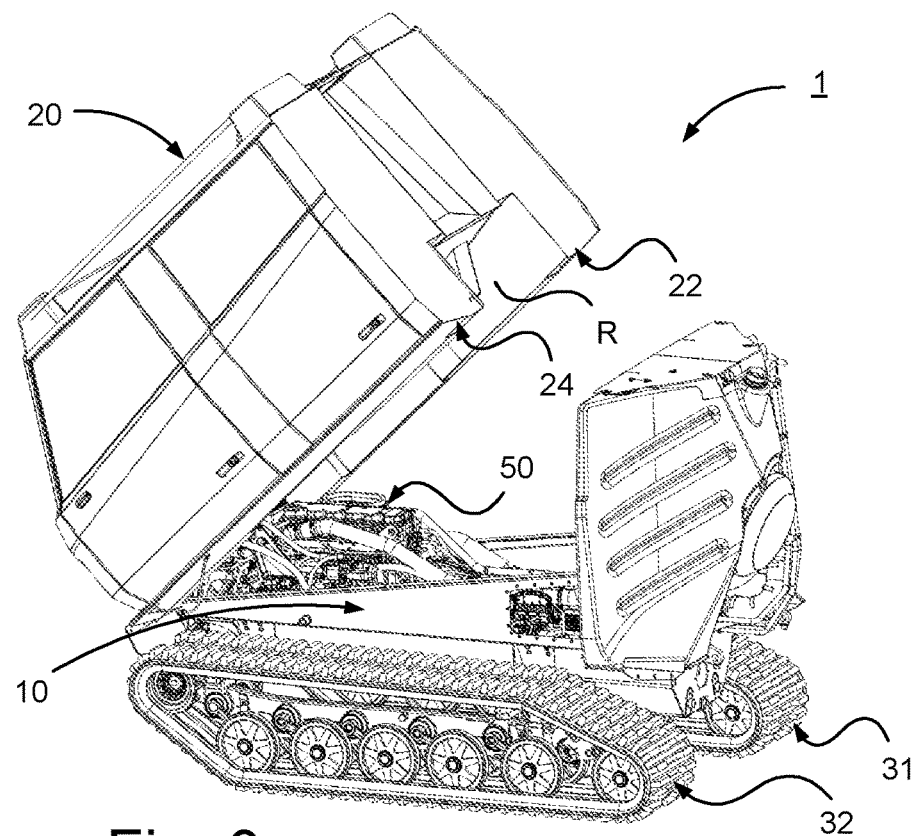
FIG. 3 schematically illustrates a rear perspective view of the vehicle in FIG. 1a with the cab tilted to an open position.
Figure 9:
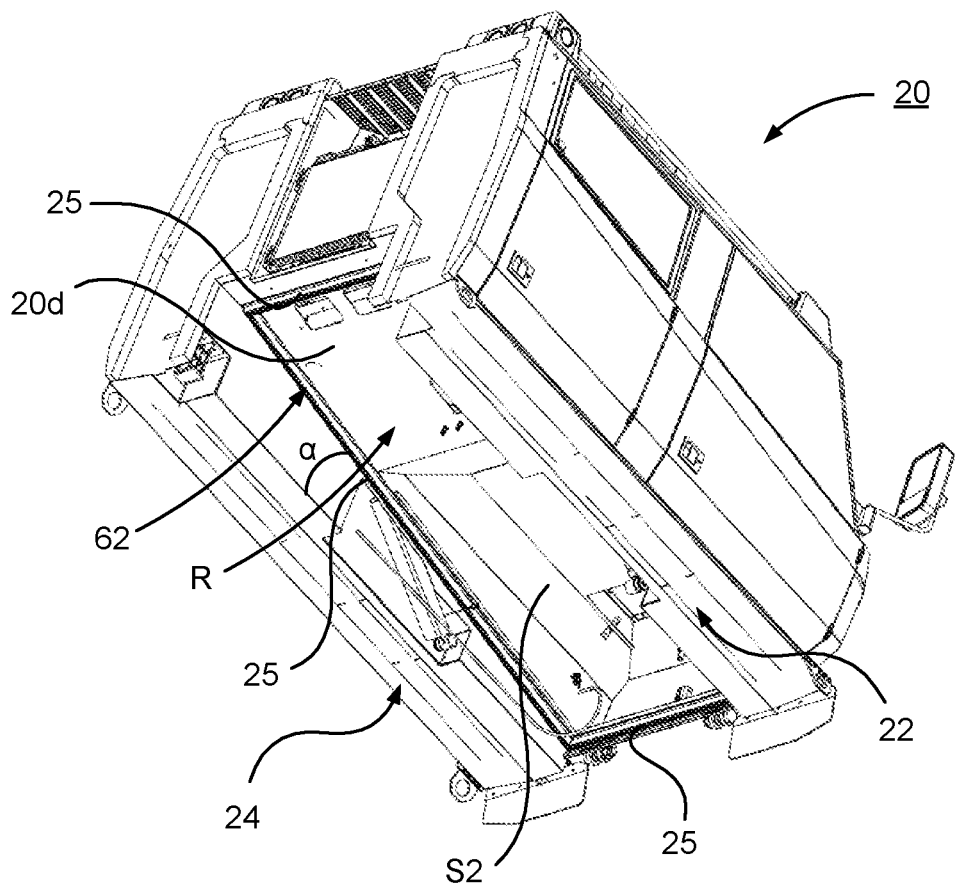
FIG. 9 schematically illustrates a perspective view of the cab of the tracked vehicle in FIG. 1a with a sealing element of a sealing arrangement according to an embodiment of the invention.

As shown in FIG. 3 and FIG. 9 the underside 20d of the cab 20 has a recess R for receiving the vehicle frame 10. The recess constitutes a space S2 for receiving the vehicle frame 10 and thus the engine configuration 50 as shown in FIG. 9.

The recess R has a longitudinal extension running centrally on the underside of the cab 20. Thus, structures 22, 24 in the form of a right wall portion 22 and a left wall portion 24 of the right and left side 20a, 20b of the cab 20 are extending below the recess R. The recess R on the underside of the cab 20 comprises a contact surface 25 having a frame configuration. The contact surface 25 has a rectangular shape. The contact surface 25 is arranged to run peripherally in the recess 25. The contact surface 25 of the cab 20 is arranged along the inside of the wall portions 22, 24 and in connection to the front side and rear side of the underside 20d of the cab 20.

The contact surface 25 on the underside of the cab 20 is configured to form a plane. The contact surface 25 on the underside of the cab 20 thus has a planar configuration. The plane has a certain inclination a relative to the horizontal plane of the vehicle 1 corresponding to the inclination of the plane formed by the contact surface 14c of the vehicle frame 10, i.e. the contact surface 14c of the extension frame 14 of the vehicle frame.

The contact surface 25 on the underside of the cab 20 has a shape and size substantially corresponding to the contact surface 14c of the vehicle frame 10, i.e. the contact surface 14c of the extension frame 14 of the vehicle frame.

The cab 20 is thus configured such that wall portions 22, 24 of said cab 20 are configured to extend externally relative to and a certain distance downwardly along the wall elements 14a, 14b of said extension frame 14.

The extension frame 14 is thus configured such that structures 22, 24, i.e. the wall portions 22, 24 of the cab 20 are configured to extend externally relative to and below side portions 14a, 14b of said extension frame 14.

The contact surface 25 of the cab 20 is arranged to face the contact surface 14c of the vehicle frame in the closed position. Thus, the contact surface 14c of the vehicle frame is arranged to receive the contact surface 25 of the cab in the closed position. The contact surface 14c of the vehicle frame 10 is substantially aligned with the contact surface 25 of the cab in the closed position.

The vehicle 1 further comprises a stand 80 vertically arranged in connection to the rear side of the vehicle frame 10, the stand 80 being shown in e.g. FIG. 1a and FIG. 7. The stand 80 is configured to receive and support a fuel tank 82 of the vehicle 1. The stand 80 is further arranged to receive a cooler device 84 of the vehicle 1. The fuel tank 82 and the cooler device 84 are vertically arranged in connection to the stand 80. The stand 80 is connected to the rear portion of the extension frame 14 of the vehicle frame 10. The stand 80 is according to an embodiment connected to the vehicle frame 10 by means of a welded joint. The extension frame with the rear portion thus facilitates an efficient and stable attachment of fuel tank 82 and cooler device 84 which may be arranged vertically at the rear portion of the vehicle frame via the stand 80.

The fuel tank 82 and the cooler device 84 are connected to the engine configuration 50 via the back element 15 of the vehicle frame 10, i.e. via connection points of the back element 15.

Figure 11:
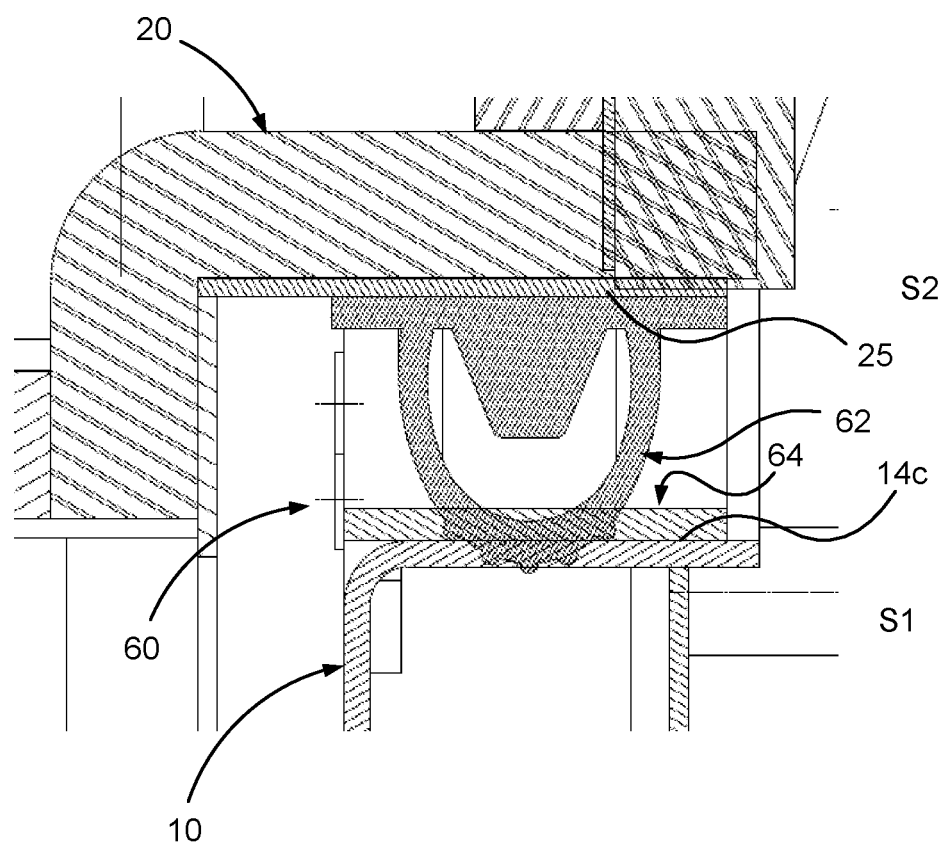
FIG. 11 schematically illustrates a cross sectional view of part of sealing between the cab and the vehicle frame by means of the sealing arrangement according to an embodiment of the invention.

The vehicle 1 comprises a sealing arrangement 60 according to the present invention as shown in FIG. 11. FIG. 11 schematically illustrates a cross sectional view of part of sealing between the cab 20 and the vehicle frame 10 by means of the sealing arrangement 60 according to an embodiment of the invention.

The sealing arrangement 60 comprises sealing means 62, 64 arranged to provide sealing between the cab 20 and the vehicle frame 10 in the closed position of the vehicle 1. The sealing means 62, 64 is arranged to provide liquid tight sealing between the cab 20 and the vehicle frame 10.

The sealing means 62, 64 comprises a first sealing element 62 extending along the contact surface 25 of said cab 20. The sealing means 62, 64 comprises a second sealing element 64 extending along the contact surface 14c of the vehicle frame 10. The contact surfaces 25, 14c are thus defining a sealing plane for providing said sealing in the closed position by means of the sealing means 62, 64. By thus defining a sealing plane by means of said contact surfaces and having a first sealing element 62 extending along the contact surface 25 of the cab 20 and a second sealing element 64 extending along the contact surface 14c of the vehicle frame 10, i.e. the contact surface 14c of the extension frame 14 of the vehicle frame 10, an efficient sealing is obtained in the closed position of the cab 20.

The first sealing element 62 of the sealing means is thus arranged in connection to the contact surface 25 of the cab 20. The second sealing element 64 of the sealing means is thus arranged in connection to the contact surface 14c of the vehicle frame 10.

Thus, the at least one sealing element in the form of the first sealing element 62 of the sealing means, extending along the contact surface 25 of said cab is arranged recessed into the recess R on the underside of the cab so that a portion of the cab overhangs the sealing plane when the cab is in the closed position so as to provide additional protection of the sealing plane when the cab is in the closed position.

According to an embodiment at least one sealing element 62, 64 is a sealing strip.

The first sealing element 62 arranged in connection to the contact surface 25 of the cab 20 has a sealing surface 62a. The second sealing element 64 arranged in connection to the contact surface 14c of the vehicle frame 10 has a sealing surface 62a. The sealing surface 62a of the first sealing element 62 is arranged to be in contact with the sealing surface 64a of the second sealing element 64 in the closed position of the cab 20 so as to provide sealing between the cab 20 and the vehicle frame 10 in the closed position of the vehicle 1.

The first sealing element 62 arranged in connection to the contact surface 25 of the cab 20 is according to an embodiment inflatable as explained in more detail below with reference to FIG. 7. The first sealing element 62 may be made of any suitable material for providing efficient liquid tight sealing. The sealing material of the first sealing element 62 is according to an embodiment made of a material resistant against one or more of: heat, cold, liquids such as oil, gasoline etc. The sealing material of the first sealing element 62 is according to an embodiment made of a material resistant to wear. The sealing material of the first sealing element 62 is according to an embodiment made of an elastic material. The sealing material of the first sealing element 62 is according to an embodiment made of rubber. The sealing material of the first sealing element 62 is according to an embodiment made of silicone.

The second sealing element 64 arranged in connection to the contact surface 14c of the vehicle frame 10 is according to an embodiment made of stainless steel. By having the second sealing element 64 made of stainless steel provides an efficient sealing when interacting with the first sealing element 62 made of a rubber material. The second sealing element 64 may be made of other material with similar properties as stainless steel, such as a brass material, a conductive carbon fibre material, a copper material, a silver material or the like. The second sealing element 64 could alternatively be made of rubber or silicone.

The second sealing element 64 made of stainless steel is according to an embodiment attached to the contact surface by means of a welding joint. The second sealing element 64 made of stainless steel is thus welded to the contact surface 14c of the vehicle frame 10.

Figure 5:
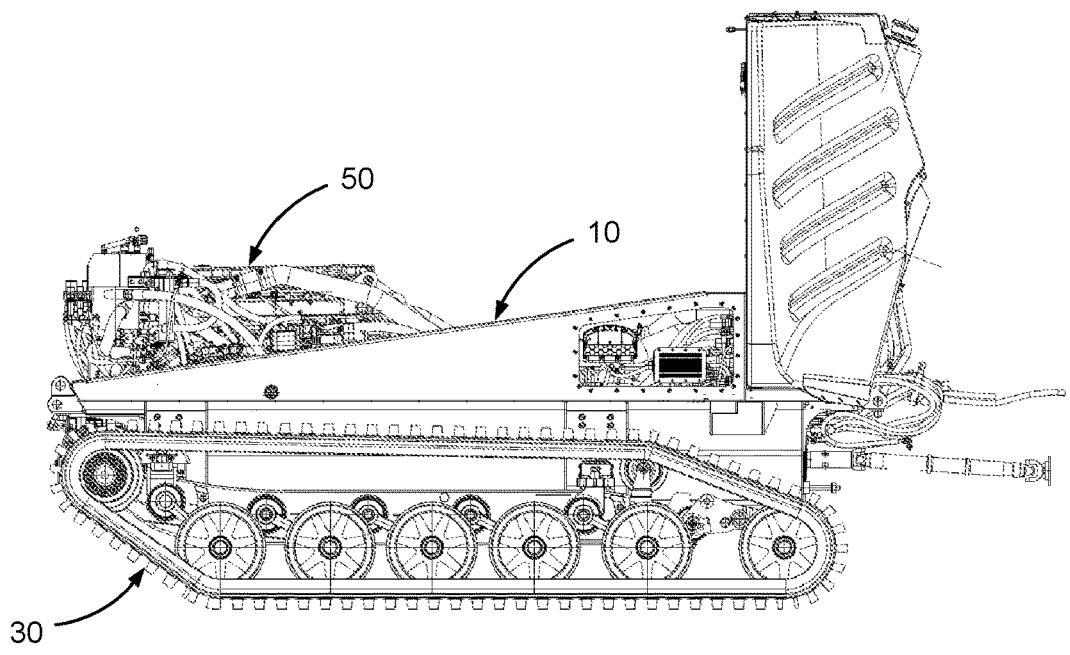
FIG. 5 schematically illustrates a side view of the vehicle frame with track assembly pair in FIG. 4.

The sealing arrangement 60 is, in the closed position, arranged to provide a confined space S1, S2 for protecting components comprising the engine configuration 50 of said vehicle 1 enclosed inside said space S1, S2. S1 is the space within the vehicle frame 10 as illustrated in FIGS. 3 and S2 is the space within the underside 20d of the cab 20 as illustrated in FIG. 5, the enclosed space S1, S2 thus being constituted by the space S1 and space S2 as illustrated schematically beside the detail of the vehicle frame 10 and cab 20 in FIG. 7. Thus, in the closed position the space S1 of the vehicle frame 10 and the space S2 of the recess on the underside 20d of the cab forms a confined space by means of the contact surfaces 14c, 25 abutting each other so that the first and second sealing elements 62, 64 provides a sealing in the thus defined sealing plane. The contact surfaces 14c, 25 are thus arranged to abut each other via the sealing means 62, 64 in the closed position of the cab 20. By thus providing a confined space in the closed position of the cab 20 vehicle components such as components of an engine configuration are sealingly protected in an efficient way.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. A tracked amphibious vehicle having a vehicle frame and a pair of track assemblies attachable to a respective side of said vehicle frame, said vehicle frame being arranged to support a vehicle cab and an engine configuration, characterized in that said vehicle frame is arranged to receive said cab via a hinge so as to allow tilting of said cab about said hinge between a closed position and an open position, said vehicle frame comprising a pair of separated longitudinal wall elements extending in the longitudinal direction of the tracked vehicle and a bottom element connecting said pair of longitudinal wall elements so as to form a space for supporting and housing said engine configuration, wherein said space becomes accessible when the cab is in said open position, wherein said vehicle frame further comprises an extension frame forming an extension in a substantially vertical direction, wherein said extension frame is wedge-shaped so that the extension frame has a decreasing vertical extension in direction from the rear portion to a front portion of the vehicle frame, said vehicle frame is configured to have a lateral extension on its respective side ending prior to or substantially at the level of the a respective track of the pair of track assemblies when assembled to the vehicle frame so that no portion of the vehicle frame extends laterally passed the respective track of said pair of track assemblies so as to allow easy access to said space.

2. A tracked amphibious vehicle according to claim 1, wherein said extension frame forming an extension in a substantially vertical direction so that a rear portion of the vehicle frame extends above a top portion of a rear section of the engine configuration.

3. A tracked amphibious vehicle according to claim 1, wherein said hinge is configured to be arranged in the front portion of said vehicle frame.

4. A tracked amphibious vehicle according to claim 1, wherein said extension frame is configured such that structures of said cab are configured to extend externally relative to and below side portions of said extension frame.

5. A tracked amphibious vehicle according to claim 1, comprising a sealing arrangement comprising a seal arranged to provide sealing between the cab and the vehicle frame in the closed position.

6. A tracked amphibious vehicle according to claim 5, wherein the sealing arrangement, when the cab is in the closed position, is arranged to provide a confined space for protecting components comprising the engine configuration.

* * * * *